United States Patent
Zilberman

(10) Patent No.: US 8,766,823 B2
(45) Date of Patent: Jul. 1, 2014

(54) KEYBOARD CONFIGURATIONS

(75) Inventor: Arkady G. Zilberman, Lewis Center, OH (US)

(73) Assignee: Bekad MGMT. II, LLC., Wilmington, DE (US)

( * ) Notice: Subject to any disclaimer, the term of this patent is extended or adjusted under 35 U.S.C. 154(b) by 1149 days.

(21) Appl. No.: 12/720,284

(22) Filed: Mar. 9, 2010

(65) Prior Publication Data

US 2010/0302157 A1   Dec. 2, 2010

Related U.S. Application Data

(60) Division of application No. 11/776,440, filed on Jul. 11, 2007, now Pat. No. 7,701,364, which is a continuation of application No. 11/232,601, filed on Sep. 22, 2005, now Pat. No. 8,065,525.

(60) Provisional application No. 60/612,193, filed on Sep. 22, 2004.

(51) Int. Cl.
   *H03M 11/00*   (2006.01)
(52) U.S. Cl.
   USPC .................... 341/22; 341/20; 341/21; 341/23
(58) Field of Classification Search
   USPC .......................................... 341/20, 21, 22, 23
   See application file for complete search history.

(56) References Cited

U.S. PATENT DOCUMENTS

| | | | |
|---|---|---|---|
| 3,945,482 A | * | 3/1976 | Einbinder ..................... 400/486 |
| 4,210,899 A | | 7/1980 | Swonger et al. |
| 4,218,738 A | | 8/1980 | Matyas et al. |
| 4,227,253 A | | 10/1980 | Ehrsam et al. |
| 4,264,782 A | | 4/1981 | Konheim |
| 4,288,659 A | | 9/1981 | Atalla |
| 4,338,025 A | | 7/1982 | Engel |
| 4,386,266 A | | 5/1983 | Chesarek |
| 4,430,728 A | | 2/1984 | Beitel et al. |
| 4,499,462 A | | 2/1985 | Stoesser et al. |
| 4,805,222 A | | 2/1989 | Young et al. |
| 5,156,475 A | | 10/1992 | Zilberman |
| 5,204,966 A | | 4/1993 | Wittenberg et al. |

(Continued)

FOREIGN PATENT DOCUMENTS

JP       2002032142       1/2002

OTHER PUBLICATIONS

"Advisory Action", U.S. Appl. No. 11/232,601, (Jul. 26, 2010), 7 pages.

(Continued)

*Primary Examiner* — Hai Phan
*Assistant Examiner* — Amine Benlagsir
(74) *Attorney, Agent, or Firm* — Brundidge & Stanger, P.C.

(57) ABSTRACT

Keyboard configurations are described. In embodiments, a keyboard includes a microcontroller to register key inputs, a memory to store time durations that correspond to the key inputs, and an algorithm that generates an input signature based on the time durations that correspond to the key inputs. The input signature can be used for user authentication and identity theft protection, and/or used to validate users for access to a computer system. The input signature may also include a watermark, a timestamp, or voice stamp for further security. An input system that includes a keyboard can provide multi-modal biometric protection by supplementing keystroke-scans with fingerprint, voice-scan, signature-scan and mouse-scan verification.

9 Claims, 17 Drawing Sheets

(56) References Cited

U.S. PATENT DOCUMENTS

| | | | |
|---|---|---|---|
| 5,270,709 A * | 12/1993 | Niklsbacher | 341/20 |
| 5,337,043 A | 8/1994 | Gokcebay | |
| 5,339,358 A * | 8/1994 | Danish et al. | 379/368 |
| 5,491,752 A | 2/1996 | Kaufman et al. | |
| 5,612,691 A | 3/1997 | Murmann | |
| 5,638,446 A | 6/1997 | Rubin | |
| 5,682,475 A | 10/1997 | Johnson et al. | |
| 5,721,780 A | 2/1998 | Ensor et al. | |
| 5,826,029 A | 10/1998 | Gore et al. | |
| 5,875,249 A | 2/1999 | Mintzer et al. | |
| 5,892,499 A * | 4/1999 | Vulk, Jr. | 345/156 |
| 5,995,026 A | 11/1999 | Sellers | |
| 6,084,576 A * | 7/2000 | Leu et al. | 345/168 |
| 6,101,461 A | 8/2000 | Ukigawa et al. | |
| 6,405,922 B1 * | 6/2002 | Kroll | 235/379 |
| 6,442,692 B1 * | 8/2002 | Zilberman | 713/184 |
| 6,618,806 B1 | 9/2003 | Brown et al. | |
| 6,626,358 B1 | 9/2003 | Breimesser et al. | |
| 6,662,300 B1 | 12/2003 | Peters | |
| 6,735,310 B1 | 5/2004 | Hsing et al. | |
| 6,809,722 B2 | 10/2004 | Mei et al. | |
| 6,860,661 B1 * | 3/2005 | Daoud | 400/488 |
| 6,895,514 B1 | 5/2005 | Kermani | |
| 6,983,057 B1 | 1/2006 | Ho et al. | |
| 7,050,608 B2 | 5/2006 | Dobashi | |
| 7,159,191 B2 | 1/2007 | Koivuniemi | |
| 7,206,938 B2 * | 4/2007 | Bender et al. | 713/186 |
| 7,274,804 B2 * | 9/2007 | Hamid | 382/115 |
| 7,278,027 B1 | 10/2007 | Todaka et al. | |
| 7,296,233 B2 | 11/2007 | Tan et al. | |
| 7,350,078 B1 | 3/2008 | Odom | |
| 7,386,731 B2 | 6/2008 | Sanai et al. | |
| 7,395,506 B2 | 7/2008 | Tan et al. | |
| 7,502,937 B2 | 3/2009 | McKinley et al. | |
| 7,606,768 B2 | 10/2009 | Graubart et al. | |
| 7,664,960 B1 | 2/2010 | Clubb | |
| 7,701,364 B1 | 4/2010 | Zilberman | |
| 7,747,868 B2 | 6/2010 | Park | |
| 7,802,103 B2 * | 9/2010 | Bender et al. | 713/182 |
| 2002/0021601 A1 * | 2/2002 | Chornenky | 365/200 |
| 2002/0109677 A1 | 8/2002 | Taylor | |
| 2003/0110402 A1 | 6/2003 | Park | |
| 2003/0122779 A1 * | 7/2003 | Martin et al. | 345/156 |
| 2003/0192746 A1 | 10/2003 | Suzuki | |
| 2004/0139331 A1 | 7/2004 | Sanai et al. | |
| 2004/0162999 A1 | 8/2004 | Schreiber et al. | |
| 2004/0186725 A1 | 9/2004 | Maruyama | |
| 2005/0076239 A1 | 4/2005 | Locke et al. | |
| 2005/0160297 A1 | 7/2005 | Ogawa | |
| 2005/0246138 A1 | 11/2005 | Park | |
| 2006/0098236 A1 | 5/2006 | Yamashita et al. | |
| 2006/0190724 A1 | 8/2006 | Adams et al. | |
| 2006/0195328 A1 | 8/2006 | Abraham et al. | |
| 2006/0271790 A1 | 11/2006 | Chen | |
| 2007/0199054 A1 | 8/2007 | Florencio et al. | |
| 2007/0234056 A1 | 10/2007 | Mani et al. | |
| 2008/0071545 A1 | 3/2008 | Novack et al. | |
| 2008/0098222 A1 | 4/2008 | Zilberman | |
| 2008/0297433 A1 | 12/2008 | Heller et al. | |
| 2009/0134972 A1 | 5/2009 | Wu, Jr. et al. | |
| 2009/0240949 A9 | 9/2009 | Kitchens et al. | |

OTHER PUBLICATIONS

"Advisory Action", U.S. Appl. No. 11/232,601, (Sep. 9, 2010), 6 pages.

U.S. Appl. No. 11/312,218, filed Dec. 20, 2005.

U.S. Appl. No. 11/190,108, with a Preliminary Amendment, filed Jul. 25, 2005.

U.S. Appl. No. 11/072,845, with a Preliminary Amendment, filed Mar. 4, 2005.

Notice of Allowance dated Dec. 3, 2009 for U.S. Appl. No. 11/776,440.

Office Action dated Oct. 14, 2008 for U.S. Appl. No. 11/232,601.

Willem, De Ru et al., "Enhanced Password Authentication through Fuzzy Logic", *IEEE Expert/ Intelligent Systems & Their Applications*, (Nov./Dec. 1997), 1 page.

"5.4 Security, Technology Forecast 1998", (1998), 12 pages.

"Typing Carpal Tunnel Syndrome and Ergonomic Keyboards", http://www.geocities.com/researchTriangel/5288/typing.html, visited May 14th, 1998, 7 pages.

Rubin, Aviel D., et al., "Web Security Sourcebook", Publisher: Wiley, 1 edition, ISBN 047118148X,(Jun. 4, 1997), pp. 73-74, 147-149.

"BioPassword Undeniably Identified", *Net Nanny Software International, Inc.*, 10 pages.

"BioPassword Undeniably Identified, an Overview of Our Patented Keystroke Dynamic Technology", *Net Nanny Software International, Inc.*, 9 pages.

Herford, Nika, et al., "Net Nanny Releases Much Anticipated Alpha Version of BioPassword, its Patented Keystroke Dynamics Security Solution", Retrieved from: <http://www.netnanny.com/news_archive/980826.htm> on Jun. 14, 1999, Press Release,.(Aug. 26, 1998), 3 pages.

"PC Tech", <wysiwyg://265/http://.zdnet.com/pcmag/pctech/content/18/07/tu1807.001.html>, Visited Jun. 14, 1999, 2 pages.

Phillips, Ken, "Biometric Identification looms on landscape of network log-ins", http://ww8.zdnet.com/pcweek/reviews/0324/24bio.html, visited Jun. 14, 1999, (Mar. 27, 1997), 4 pages.

"Non Final Office Action", U.S. Appl. No. 11/232,601, (Jun. 23, 2009), 17 pages.

"Non Final Office Action", U.S. Appl. No. 11/776,440, (Jul. 24, 2009), 12 pages.

"Restriction Requirement", U.S. Appl. No. 11/232,601, (Jan. 22, 2010), 5 pages.

"Notice of Allowance", U.S. Appl. No. 11/776,440, (Dec. 3, 2009), 6 pages.

Office Action Restriction dated Mar. 15, 2011 in U.S. Appl. No. 11/232,601.

Notice of Allowance dated Jul. 12, 2011 in U.S. Appl. No. 11/232,601.

"Supplemental NOA", U.S. Appl. No. 11/776,440, (Mar. 25, 2010), 3 pages.

"Final Office Action", U.S. Appl. No. 11/232,601, (May 12, 2010), 17 pages.

\* cited by examiner

Integral Mouse Grid (50 x 50) for recording cursor movements (shows top part)

Integral Mouse Grid (50 x 50) for recording cursor movements (shows bottom part)

| symbols | double symbols | a | b | c | d | e | f | g | h | i | j | k | l | m | n | o | p | q | r |
|---|---|---|---|---|---|---|---|---|---|---|---|---|---|---|---|---|---|---|---|
| | | 2 | 3 | 4 | 5 | 6 | 7 | 8 | 9 | 10 | 11 | 12 | 13 | 14 | 15 | 16 | 17 | 18 | 19 |
| | | $t_a$ | $f_{ab}$ | $f_{ac}$ | $f_{ad}$ | $f_{ae}$ | $f_{af}$ | $f_{ag}$ | $f_{ah}$ | $f_{ai}$ | $f_{aj}$ | $f_{ak}$ | $f_{al}$ | $f_{am}$ | $f_{an}$ | $f_{ao}$ | $f_{ap}$ | $f_{aq}$ | $f_{ar}$ |
| a/1 | aa/1 | | | | | | | | | | | | | | | | | | |
| b/2 | bb/51 | $f_{ba}/52$ | $t_b 53$ | | | | | | | | | | | | | | | | |
| c/3 | cc/101 | $f_{ca}/102$ | | $t_c 104$ | | | | | | | | | | | | | | | |
| d/4 | dd/151 | $f_{da}/152$ | | | $t_d 155$ | | | | | | | | | | | | | | |
| e/5 | ee/201 | $f_{ea}/202$ | | | | $t_e 206$ | | | | | | | | | | | | | |
| f/6 | ff/251 | $f_{fa}/252$ | | | | | $t_f 257$ | | | | | | | | | | | | |
| g/7 | gg/301 | $f_{ga}/302$ | | | | | | $t_g 308$ | | | | | | | | | | | |
| h/8 | hh/351 | $f_{ha}/352$ | | | | | | | $t_h 359$ | | | | | | | | | | |
| i/9 | ii/401 | $f_{ia}/402$ | | | | | | | | $t_i 410$ | | | | | | | | | |
| j/10 | jj/451 | $f_{ja}/452$ | | | | | | | | | $t_j 461$ | | | | | | | | |
| k/11 | kk/501 | $f_{ka}/502$ | | | | | | | | | | $t_k 512$ | | | | | | | |
| l/12 | ll/551 | $f_{la}/552$ | | | | | | | | | | | $t_l 563$ | | | | | | |
| m/13 | mm/601 | $f_{ma}/602$ | | | | | | | | | | | | $t_m 614$ | | | | | |
| n/14 | nn/651 | $f_{na}/652$ | | | | | | | | | | | | | $t_n 665$ | | | | |
| o/15 | oo/701 | $f_{oa}/702$ | | | | | | | | | | | | | | $t_o 716$ | | | |
| p/16 | pp/751 | $f_{pa}/752$ | $f_{pb}$ | $f_{pc}$ | $f_{pd}$ | $f_{pe}$ | $f_{pf}$ | $f_{pg}$ | $f_{ph}$ | $f_{pi}$ | $f_{pj}$ | $f_{pk}$ | $f_{pl}$ | $f_{pm}$ | $f_{pn}$ | $f_{po}$ | $t_p 767$ | | |
| q/17 | qq/801 | $f_{qa}/802$ | $f_{qb}$ | $f_{qc}$ | $f_{qd}$ | $f_{qe}$ | $f_{qf}$ | $f_{qg}$ | $f_{qh}$ | $f_{qi}$ | $f_{qj}$ | $f_{qk}$ | $f_{ql}$ | $f_{qm}$ | $f_{qn}$ | $f_{qo}$ | $f_{qp}$ | $t_q 818$ | |
| r/18 | rr/851 | $f_{ra}/852$ | $f_{rb}$ | $f_{rc}$ | $f_{rd}$ | $f_{re}$ | $f_{rf}$ | $f_{rg}$ | $f_{rh}$ | $f_{ri}$ | $f_{rj}$ | $f_{rk}$ | $f_{rl}$ | $f_{rm}$ | $f_{rn}$ | $f_{ro}$ | $f_{rp}$ | $f_{rq}$ | $t_r 869$ |
| s/19 | ss/901 | $f_{sa}/902$ | | | | | | | | | | | | | | | | | |
| t/20 | tt/951 | $f_{ta}/952$ | | | | | | | | | | | | | | | | | |

Fig – 11A  Integral Typing Matrix for creating individual digital signature irrespective of input text (shows the left section of the Integral Typing Matrix)

| symbols | double symbols | a | b | c | d | e | f | g | h | i | j | k | l | m | n | o | p | q | r |
|---|---|---|---|---|---|---|---|---|---|---|---|---|---|---|---|---|---|---|---|
| u/21 | uu | | | | | | | | | | | | | | | | | | |
| v/22 | vv | | | | | | | | | | | | | | | | | | |
| w/23 | ww | | | | | | | | | | | | | | | | | | |
| x/24 | xx | | | | | | | | | | | | | | | | | | |
| y/25 | yy | | | | | | | | | | | | | | | | | | |
| z/26 | zz | | | | | | | | | | | | | | | | | | |
| 27/1 | 11 | | | | | | | | | | | | | | | | | | |
| 28/2 | 22 | | | | | | | | | | | | | | | | | | |
| 29/3 | 33 | | | | | | | | | | | | | | | | | | |
| 30/4 | 44 | | | | | | | | | | | | | | | | | | |
| 31/5 | 55 | | | | | | | | | | | | | | | | | | |
| 32/6 | 66 | | | | | | | | | | | | | | | | | | |
| 33/7 | 77 | | | | | | | | | | | | | | | | | | |
| 34/8 | 88 | | | | | | | | | | | | | | | | | | |
| 35/9 | 99 | | | | | | | | | | | | | | | | | | |
| 36/Zero | zero zero | | | | | | | | | | | | | | | | | | |
| 37/Space | space space | | | | | | | | | | | | | | | | | | |
| 38/Bcksp | bcksp bcksp | | | | | | | | | | | | | | | | | | |
| 39/del | del del | | | | | | | | | | | | | | | | | | |
| 40/↓ | ↓ ↓ | | | | | | | | | | | | | | | | | | |
| 41/← | ← ← | | | | | | | | | | | | | | | | | | |
| 42/↑ | ↑ ↑ | | | | | | | | | | | | | | | | | | |
| 43/→ | → → | | | | | | | | | | | | | | | | | | |
| 44/ / | / / | | | | | | | | | | | | | | | | | | |
| 45/ \ | \ \ | | | | | | | | | | | | | | | | | | |
| 46/Shift | shift shift | | | | | | | | | | | | | | | | | | |
| 47/Ctrl | ctrl ctrl | | | | | | | | | | | | | | | | | | |
| 48/Enter | enter enter | | | | | | | | | | | | | | | | | | |
| 49/CapsLock | caps lock caps lock | | | | | | | | | | | | | | | | | | |

Fig – 11A Integral Typing Matrix for creating individual digital signature irrespective of input text (Continuation, Figure 11A shows the left section of the Integral Typing Matrix)

| symbols | double symbols | s 20 | t 21 | u 22 | v 23 | w 24 | x 25 | y 26 | z 27 | 1 28 | 2 29 | 3 30 | 4 31 | 5 32 | 6 33 | 7 34 | 8 35 | 9 36 | 0 37 |
|---|---|---|---|---|---|---|---|---|---|---|---|---|---|---|---|---|---|---|---|
| a/1 | aa/1 | $f_{as}$ | $f_{at}$ | $f_{au}$ | $f_{av}$ | $f_{aw}$ | $f_{ax}$ | $f_{ay}$ | $f_{az}$ | $f_{a1}$ | $f_{a2}$ | $f_{a3}$ | $f_{a4}$ | $f_{a5}$ | $f_{a6}$ | $f_{a7}$ | $f_{a8}$ | $f_{a9}$ | $f_{a0}$ |
| b/2 | bb/51 | $f_{bs}/$ | | | | | | | | | | | | | | | | | |
| c/3 | cc/101 | $f_{cs}/$ | | | | | | | | | | | | | | | | | |
| d/4 | dd/151 | $f_{ds}/$ | | | | | | | | | | | | | | | | | |
| e/5 | ee/201 | $f_{es}/$ | | | | | | | | | | | | | | | | | |
| f/6 | ff/251 | $f_{fs}/$ | | | | | | | | | | | | | | | | | |
| g/7 | gg/301 | $f_{gs}/$ | | | | | | | | | | | | | | | | | |
| h/8 | hh/351 | $f_{hs}/$ | | | | | | | | | | | | | | | | | |
| i/9 | ii/401 | $f_{is}/$ | | | | | | | | | | | | | | | | | |
| j/10 | jj/451 | $f_{js}/$ | | | | | | | | | | | | | | | | | |
| k/11 | kk/501 | $f_{ks}/$ | | | | | | | | | | | | | | | | | |
| l/12 | ll/551 | $f_{ls}/$ | | | | | | | | | | | | | | | | | |
| m/13 | mm/601 | $f_{ms}/$ | | | | | | | | | | | | | | | | | |
| n/14 | nn/651 | $f_{ns}/$ | | | | | | | | | | | | | | | | | |
| o/15 | oo/701 | $f_{os}/$ | | | | | | | | | | | | | | | | | |
| p/16 | pp/751 | $f_{ps}/$ | $f_{pt}$ | $f_{pu}$ | $f_{pv}$ | $f_{pw}$ | $f_{px}$ | $f_{py}$ | $f_{pz}$ | $f_{p1}$ | $f_{p2}$ | $f_{p3}$ | $f_{p4}$ | $f_{p5}$ | $f_{p6}$ | $f_{p7}$ | $f_{p8}$ | $f_{p9}$ | |
| q/17 | qq/801 | $f_{qs}/$ | | | | | | | | | | | | | | | | | |
| r/18 | rr/851 | $f_{rs}/$ | | | | | | | | | | | | | | | | | |
| s/19 | ss/901 | $f_{ss}/$ | | | | | | | | | | | | | | | | | |
| t/20 | tt/951 | $f_{ts}/$ | $t_{971}$ | | | | | | | | | | | | | | | | |
| u/21 | uu | | | $t_{u1022}$ | | | | | | | | | | | | | | | |
| v/22 | vv | | | | $t_{v1073}$ | | | | | | | | | | | | | | |
| w/23 | ww | | | | | $t_{w1124}$ | | | | | | | | | | | | | |
| x/24 | xx | | | | | | $t_{x1175}$ | | | | | | | | | | | | |
| y/25 | yy | | | | | | | $t_{y1226}$ | | | | | | | | | | | |
| z/26 | zz | | | | | | | | $t_{z1277}$ | | | | | | | | | | |
| 27/1 | 11 | | | | | | | | | $t_{11328}$ | | | | | | | | | |

Fig – 11B

Integral Typing Matrix for creating individual digital signature irrespective of input text

| symbols | double symbols | s | t | u | v | w | x | y | z | 1 | 2 | 3 | 4 | 5 | 6 | 7 | 8 | 9 | 0 |
|---|---|---|---|---|---|---|---|---|---|---|---|---|---|---|---|---|---|---|---|
| 28/2 | 22 |  |  |  |  |  |  |  |  |  | $t_2 1379$ |  |  |  |  |  |  |  |  |
| 29/3 | 33 |  |  |  |  |  |  |  |  |  |  | $t_3 1481$ |  |  |  |  |  |  |  |
| 30/4 | 44 |  |  |  |  |  |  |  |  |  |  |  | $t_4 1532$ |  |  |  |  |  |  |
| 31/5 | 55 |  |  |  |  |  |  |  |  |  |  |  |  | $t_5 1583$ |  |  |  |  |  |
| 32/6 | 66 |  |  |  |  |  |  |  |  |  |  |  |  |  | $t_6 1634$ |  |  |  |  |
| 33/7 | 77 |  |  |  |  |  |  |  |  |  |  |  |  |  |  | $t_7 1685$ |  |  |  |
| 34/8 | 88 |  |  |  |  |  |  |  |  |  |  |  |  |  |  |  | $t_8 1736$ |  |  |
| 35/9 | 99 |  |  |  |  |  |  |  |  |  |  |  |  |  |  |  |  | $t_9 1787$ |  |
| 36/Zero | zero zero |  |  |  |  |  |  |  |  |  |  |  |  |  |  |  |  |  | $t_0 1838$ |
| 37/Space | space space |  |  |  |  |  |  |  |  |  |  |  |  |  |  |  |  |  |  |
| 38/Bcksp | bcksp bcksp |  |  |  |  |  |  |  |  |  |  |  |  |  |  |  |  |  |  |
| 39/del | del del |  |  |  |  |  |  |  |  |  |  |  |  |  |  |  |  |  |  |
| 40/↓ | ↓ ↓ |  |  |  |  |  |  |  |  |  |  |  |  |  |  |  |  |  |  |
| 41/← | ← ← |  |  |  |  |  |  |  |  |  |  |  |  |  |  |  |  |  |  |
| 42/↑ | ↑ ↑ |  |  |  |  |  |  |  |  |  |  |  |  |  |  |  |  |  |  |
| 43/→ | → → |  |  |  |  |  |  |  |  |  |  |  |  |  |  |  |  |  |  |
| 44// | // |  |  |  |  |  |  |  |  |  |  |  |  |  |  |  |  |  |  |
| 45/\ | \\ |  |  |  |  |  |  |  |  |  |  |  |  |  |  |  |  |  |  |
| 46/Shift | shift shift |  |  |  |  |  |  |  |  |  |  |  |  |  |  |  |  |  |  |
| 47/Ctrl | ctrl ctrl |  |  |  |  |  |  |  |  |  |  |  |  |  |  |  |  |  |  |
| 48/Enter | enter enter |  |  |  |  |  |  |  |  |  |  |  |  |  |  |  |  |  |  |
| 49/Caps Lock | caps lock caps lock |  |  |  |  |  |  |  |  |  |  |  |  |  |  |  |  |  |  |

Fig – 11B  Integral Typing Matrix for creating individual digital signature irrespective of input text (Continuation, Figure 11B shows the central section of the Integral Typing Matrix)

| symbols | double symbols | space | bcksp | del | ↓ | ← | ↑ | → | / | \ | shift | cntrl | enter | Caps lock |
|---|---|---|---|---|---|---|---|---|---|---|---|---|---|---|
| a/1 | aa/1 | 38 | 39 | 40 | 41 | 42 | 43 | 44 | 45 | 46 | 47 | 48 | 49 | 50 |
| b/2 | bb/51 | | | | | | | | | | | | | |
| c/3 | cc/101 | | | | | | | | | | | | | |
| d/4 | dd/151 | | | | | | | | | | | | | |
| e/5 | ee/201 | | | | | | | | | | | | | |
| f/6 | ff/251 | | | | | | | | | | | | | |
| g/7 | gg/301 | | | | | | | | | | | | | |
| h/8 | hh/351 | | | | | | | | | | | | | |
| i/9 | ii/401 | | | | | | | | | | | | | |
| j/10 | jj/451 | | | | | | | | | | | | | |
| k/11 | kk/501 | | | | | | | | | | | | | |
| l/12 | ll/551 | | | | | | | | | | | | | |
| m/13 | mm/601 | | | | | | | | | | | | | |
| n/14 | nn/651 | | | | | | | | | | | | | |
| o/15 | oo/701 | | | | | | | | | | | | | |
| p/16 | pp/751 | | | | | | | | | | | | | |
| q/17 | qq/801 | | | | | | | | | | | | | |
| r/18 | rr/851 | | | | | | | | | | | | | |
| s/19 | ss/901 | | | | | | | | | | | | | |
| t/20 | tt/951 | | | | | | | | | | | | | |
| u/21 | uu | | | | | | | | | | | | | |
| v/22 | vv | | | | | | | | | | | | | |
| w/23 | ww | | | | | | | | | | | | | |
| x/24 | xx | | | | | | | | | | | | | |
| y/25 | yy | | | | | | | | | | | | | |
| z/26 | zz | | | | | | | | | | | | | |
| 27/1 | 11 | | | | | | | | | | | | | |
| 28/2 | 22 | | | | | | | | | | | | | |
| 29/3 | 33 | | | | | | | | | | | | | |
| 30/4 | 44 | | | | | | | | | | | | | |
| 31/5 | 55 | | | | | | | | | | | | | |
| 32/6 | 66 | | | | | | | | | | | | | |
| 33/7 | 77 | | | | | | | | | | | | | |
| 34/8 | 88 | | | | | | | | | | | | | |

Fig – 11C

Integral Typing Matrix for creating individual digital signature irrespective of input text (shows the right section of the Integral Typing Matrix)

| symbols | double symbols | space | bcksp | del | ↓ | ← | ↑ | → | / | \ | shift | cntrl | enter | Caps lock |
|---|---|---|---|---|---|---|---|---|---|---|---|---|---|---|
| | | 38 | 39 | 40 | 41 | 42 | 43 | 44 | 45 | 46 | 47 | 48 | 49 | 50 |
| 35/9 | 99 | | | | | | | | | | | | | |
| 36/Zero | zero zero | | | | | | | | | | | | | |
| 37/Space | space space | $t_{space}$ 1838 | | | | | | | | | | | | |
| 38/Bcksp | bcksp bcksp | | $t_{bcksp}$ 1889 | | | | | | | | | | | |
| 39/del | del del | | | $t_{del}$ 1940 | | | | | | | | | | |
| 40/↓ | ↓ | | | | $t_↓$ 1991 | | | | | | | | | |
| 41/← | ← | | | | | $t_←$ 2042 | | | | | | | | |
| 42/↑ | ↑ | | | | | | $t_↑$ 2093 | | | | | | | |
| 43/→ | → | | | | | | | $t_→$ 2144 | | | | | | |
| 44// | // | | | | | | | | $t_/$ 2195 | | | | | |
| 45/\ | \\ | | | | | | | | | $t_\\$ 2246 | | | | |
| 46/Shift | shift shift | | | | | | | | | | $t_{shift}$ 2297 | | | |
| 47/Ctrl | ctl ctl | | | | | | | | | | | $t_{ctl}$ 2348 | | |
| 48/Enter | enter enter | | | | | | | | | | | | $t_{enter}$ 2399 | |
| 49/Caps Lock | caps lock caps lock | | | | | | | | | | | | | $t_{capslock}$ 2450 |

Fig – 11C   Integral Typing Matrix for creating individual digital signature irrespective of input text (Continuation, Figure 11C shows the right section of the Integral Typing Matrix)

KEYBOARD CONFIGURATIONS

RELATED APPLICATIONS

This application is a divisional of and claims priority to U.S. patent application Ser. No. 11/776,440 entitled "User Input Authentication and Identity Protection" filed Jul. 11, 2007 to Zilberman, the disclosure of which is incorporated by reference herein in its entirety. U.S. patent application Ser. No. 11/776,440 is a continuation of and claims priority to U.S. patent application Ser. No. 11/232,601 entitled "User Input Authentication and Identity Protection" filed Sep. 22, 2005 to Zilberman, the disclosure of which is incorporated by reference herein in its entirety. U.S. patent application Ser. No. 11/232,601 claims priority to U.S. Provisional Application Ser. No. 60/612,193 entitled "Computer Keyboard with Built-in User Authentication and Method for Identity Theft Protection" filed Sep. 22, 2004 to Zilberman, the disclosure of which is incorporated by reference herein in its entirety.

BACKGROUND

The need for people to have passwords that are easy to remember goes contrary to what makes up a good password. People are not very rigorous when ensuring the randomness of passwords. Furthermore, people usually have several passwords to keep track of and therefore are less tempted to create random and difficult-to-remember passwords. The preferred defense is to make passwords nearly impossible to guess, but such strength requires that the password be selected in a totally random fashion. That's a tall order for humans, because humans are not very good at making up randomness. Furthermore, because people usually have several passwords to keep track of, locking user accounts with random, but difficult-to-remember, strings of characters such as "wX % 95qd!" is a recipe for a support headache.

Bending the wrists sideways or up and down while using the keyboard or mouse can cause musculoskeletal disorders such as carpal tunnel syndrome. Numerous studies have shown that the split keyboard design gives the operator a more neutral forearm position compared to a traditional keyboard. Carpal tunnel syndrome (CTS) is a condition that can cause pain, tingling, numbness, and weakness in the fingers and thumb. CTS from work causes is highest between the ages of 20 and 40.

In accessing a secure computer system most of us use a username and password. The combination of a username and a password does not constitute strong authentication. That has traditionally been a weak point in authentication systems. In the modern world of global computerization we need a shift from a simple ID and password authentication that is easily intercepted to using a two-factor authentication, which requires people to identify themselves using two unique factors, such as a password along with either a digital certificate, a smart card, or a biometric proof.

SUMMARY

The proposed method for password authentication uses keystroke-scan characteristics that are unique for each individual. Accordingly, the password authentication method is unobtrusive, reliable and could be used on any data input device that could measure typing intervals with accuracy better than one millisecond.

While typing or working at a computer keyboard and performing regularly 10,000 keystrokes per hour users must have a keyboard that will alleviate the stress by improved allocation of keys and decreased force during typing. Split keyboards are designed to straighten the wrist. This can be done in two ways: by increasing the distance between the right and left sides of the keyboard or by rotating each half of the keyboard so that each half is aligned with the forearm. The proposed design uses these two methods. It also uses negative slope and concave well keyboard, elements of which could be found in special expensive keyboards offered on the current market.

The combination of advanced ergonomic design and multimodal biometric security protection provides a user-friendly solution that is easy to implement and gives maximum access, communication and transaction security, accompanied by increased functionality and comfort of use. Naturally, the user authentication method described could be also implemented on computers with conventional keyboards as a software-only solution. Furthermore, the ergonomic design of the keyboard configurations may also be implemented without the advanced authentication methods.

A keyboard-embedded microchip or keyboard microcontroller with the capability of recording time events with the resolution from 30 milliseconds down to 30 microseconds is used for static and dynamic password and user authentication according to the proposed algorithm. The proposed statistical processing of measured keystroke-scan characteristics results in creating a digital signature that contains unique typing characteristics of a person who types the password during login procedure. The same algorithm creates a unique digital signature irrespective of the input text, which could be used for dynamic unobtrusive verification of the user who is currently working at the keyboard.

The example implementation described below incorporates elements of artificial intelligence in helping customers to select a random password that is hardened by an additional digital signature. The password created during first login procedure with an input from a customer becomes a password-for-life. The ultimate keyboard provides also multimodal biometric protection, supplementing keystroke-scan method with fingerprint, voice-scan, and signature-scan or mouse-scan verification. Signature-scan authentication is performed through modified touchpad or Tablet PC and does not require special hardware. Voice-scan verification and/or authentication is performed through two or more microphones embedded in the keyboard. External microphones could be also used for identity verification purpose.

The proposed voice-scan module allows a user to record the low- and high-frequency characteristics of voice input and to use them along with the time characteristics of a recorded input for hardening the user's password and/or for protection against identity theft.

In one embodiment, a user may be trained before a strong random password is created and tested. A short self-training program is included in the first login procedure. The algorithm-created password could be used as a single sign-on password for multiple applications.

The proposed keystroke-scan and signature-scan authentication may be used in physical keyboards and/or virtual (on screen) keyboards, in USB tokens and USB Flash drives, and/or projection keyboards.

The ultimate keyboard has a great potential in becoming the first choice for OEM manufacturers since it allows tailoring the keyboard during ordering according to customers needs and personal preferences. One of the key strengths of the ultimate keyboard is versatility. For example, instead of two Enter keys in the middle of a keyboard along the left and right side of the Touchpad, a customer may select Enter and Space functions for these two keys. Or instead of a RollerBall in the middle or at the top or at the bottom of the keyboard, users could select a Trackbar, a Trackball, a reversed optical mouse, or any other pointing device for manipulating the movements of the cursor. And to give another example, a Touchpad or a Trackball could be placed at the bottom of the keyboard; this solution might be preferable for laptop users who have developed the habit of using their thumbs for mouse navigation.

The attached drawings of ergonomic keyboards do not limit the number of modules that could be incorporated in a keyboard of customers' choice. The included figures serve only as an example of choices users have in configuration of their keyboards that ensure comfort of use and security in the modern world of global computerization but do not limit the scope of applications of the proposed ultimate keyboard with built-in security protection.

Customization of keyboards during ordering will provide unparalleled functionality, comfort of use and unobtrusive and reliable security in financial and business transactions along with identity theft protection.

BRIEF DESCRIPTION OF THE DRAWINGS

Novel features and advantages, in addition to those mentioned above, will become apparent to those skilled in the art from a reading of the following detailed description in conjunction with the accompanying drawings wherein similar reference characters refer to similar parts and in which:

FIGS. 11A-11C illustrate an example integral typing matrix; and

DETAILED DESCRIPTION

Figure 1:
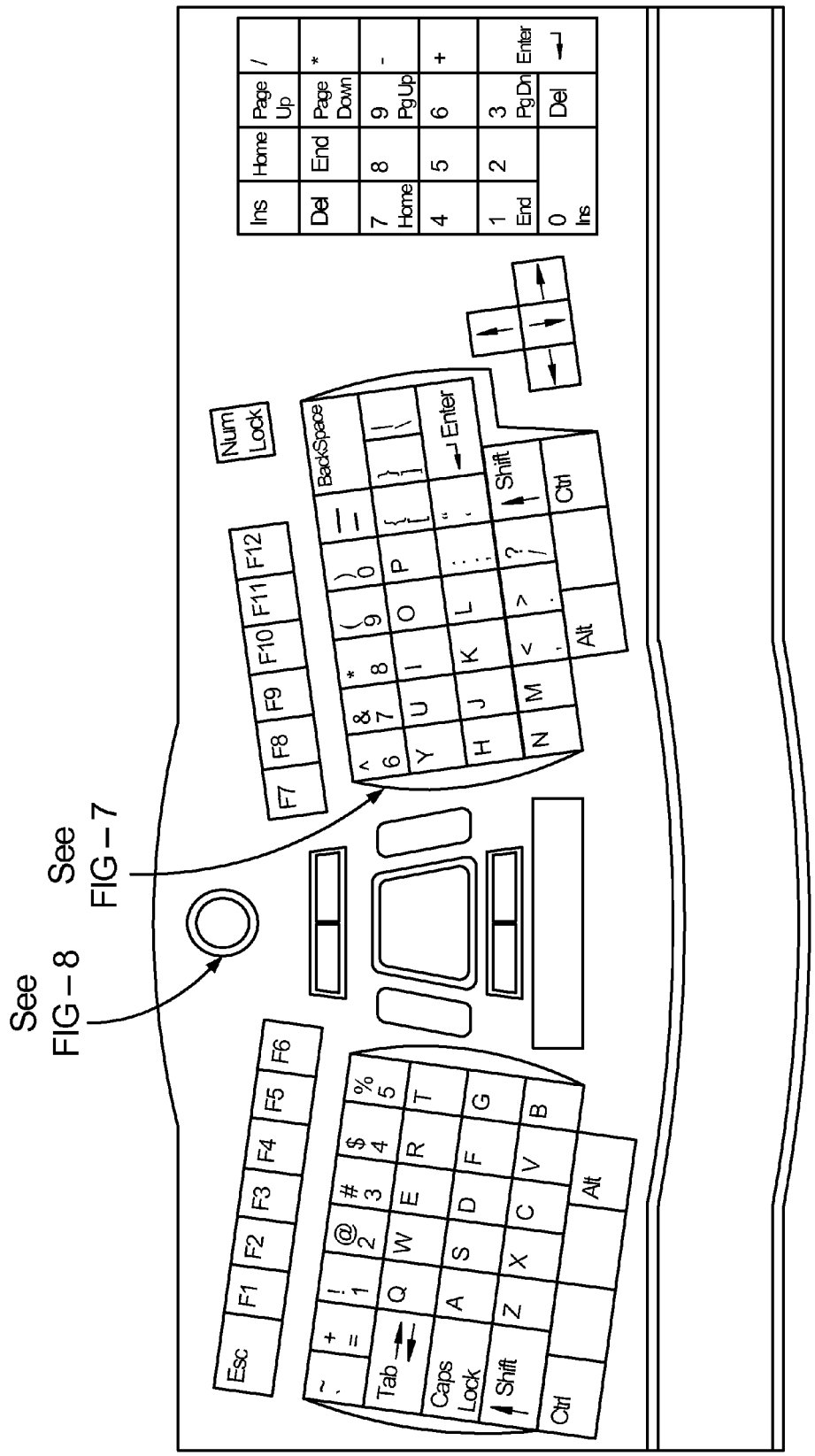
FIG. 1 illustrates one example of an ultimate keyboard in accordance with one or more embodiments.
Figure 2:
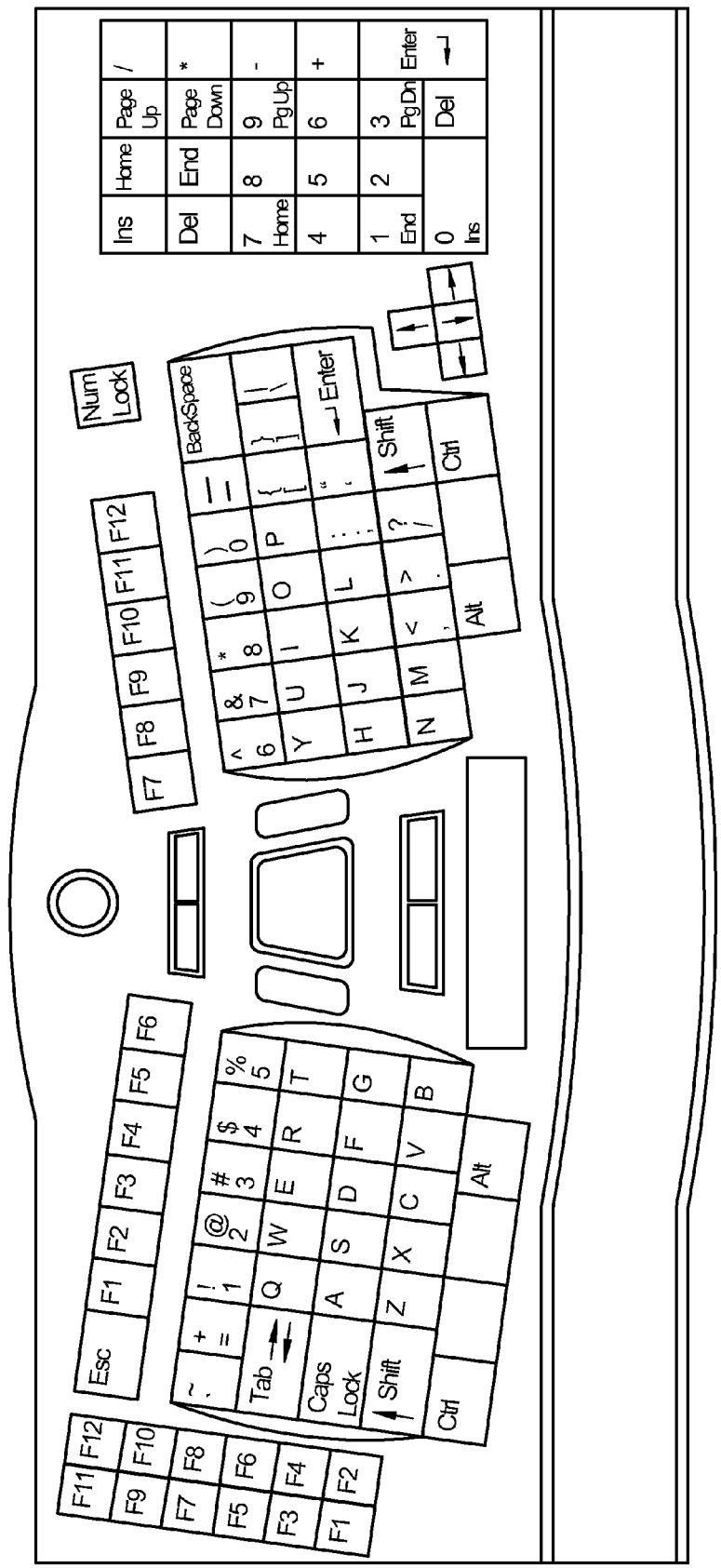
FIG. 2 illustrates another example of an ultimate keyboard in accordance with one or more embodiments.
Figure 3:
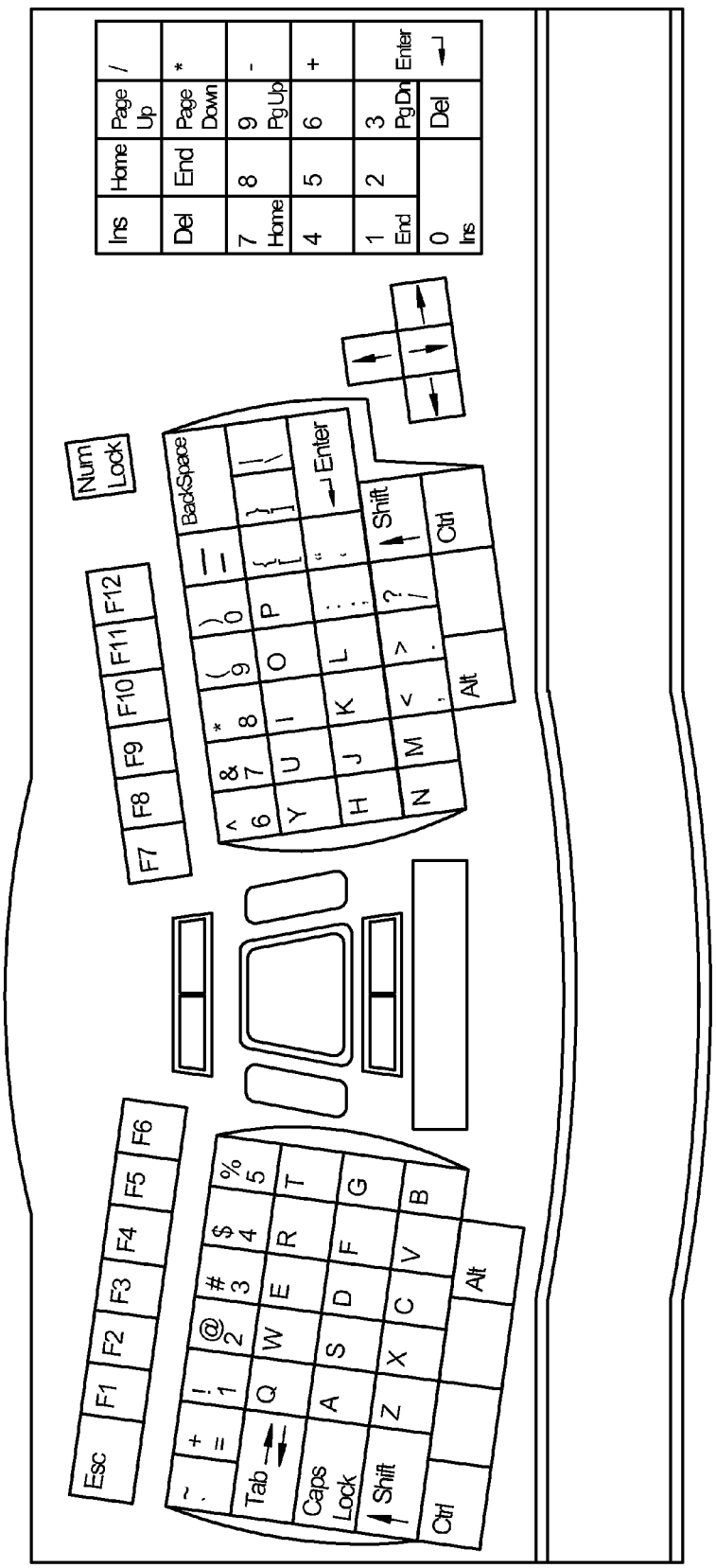
FIG. 3 illustrates another example of an ultimate keyboard in accordance with one or more embodiments.
Figure 4:
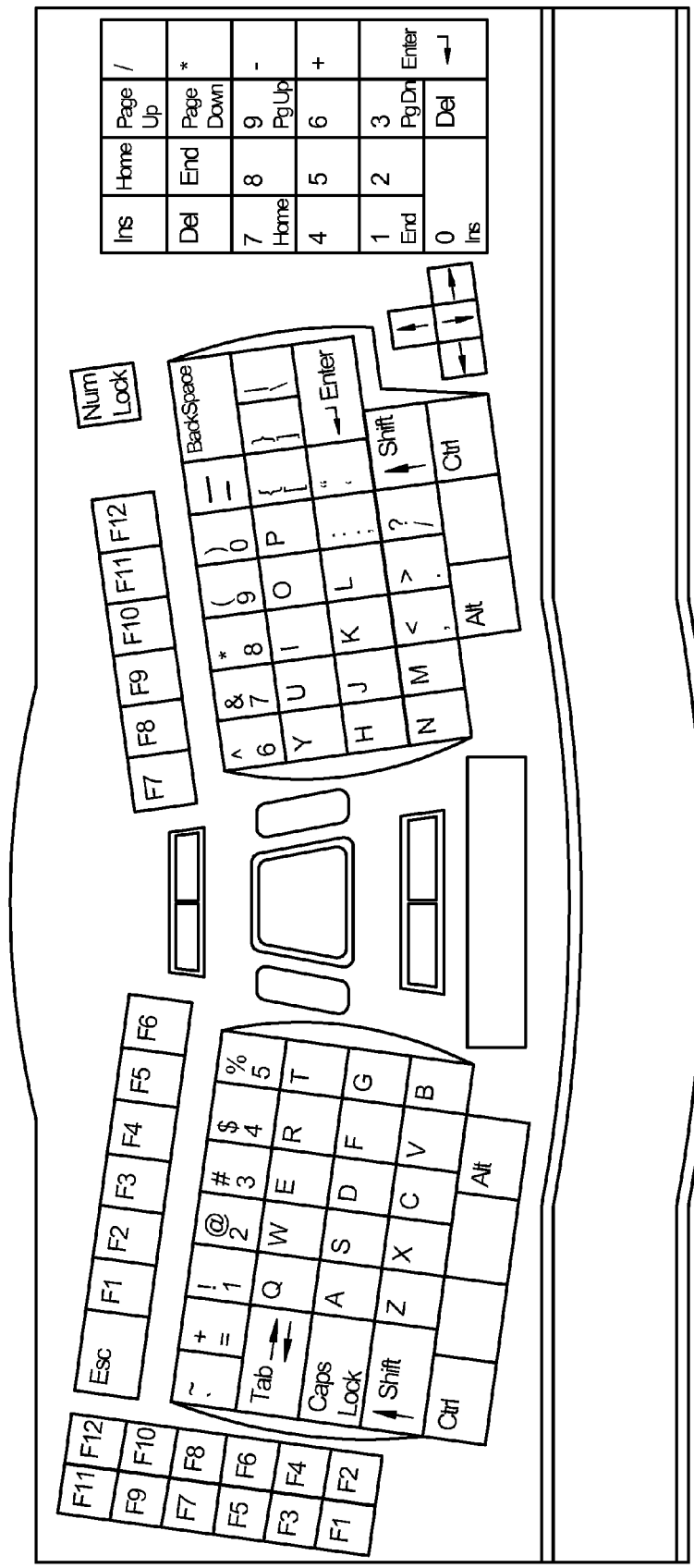
FIG. 4 illustrates another example of an ultimate keyboard in accordance with one or more embodiments.
Figure 5:
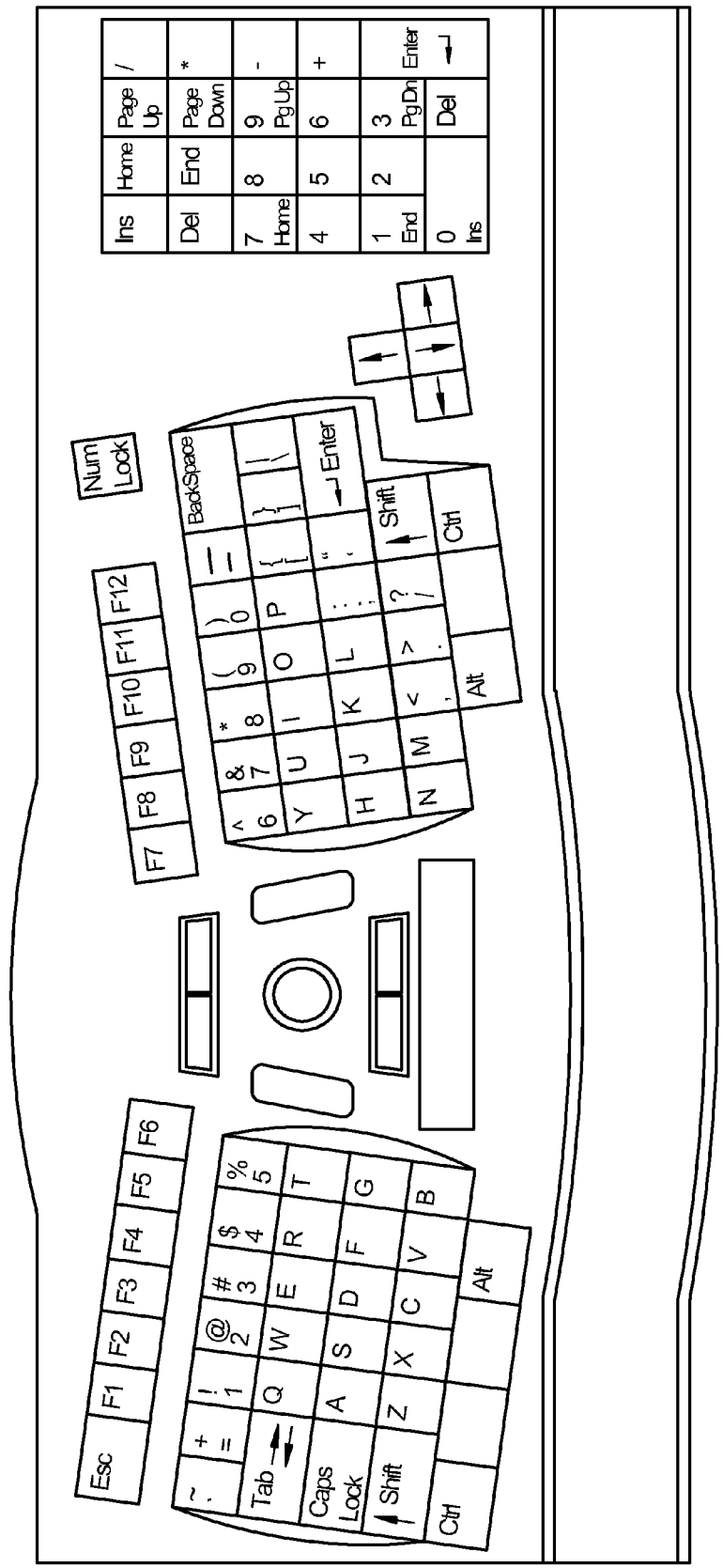
FIG. 5 illustrates another example of an ultimate keyboard in accordance with one or more embodiments.
Figure 6:
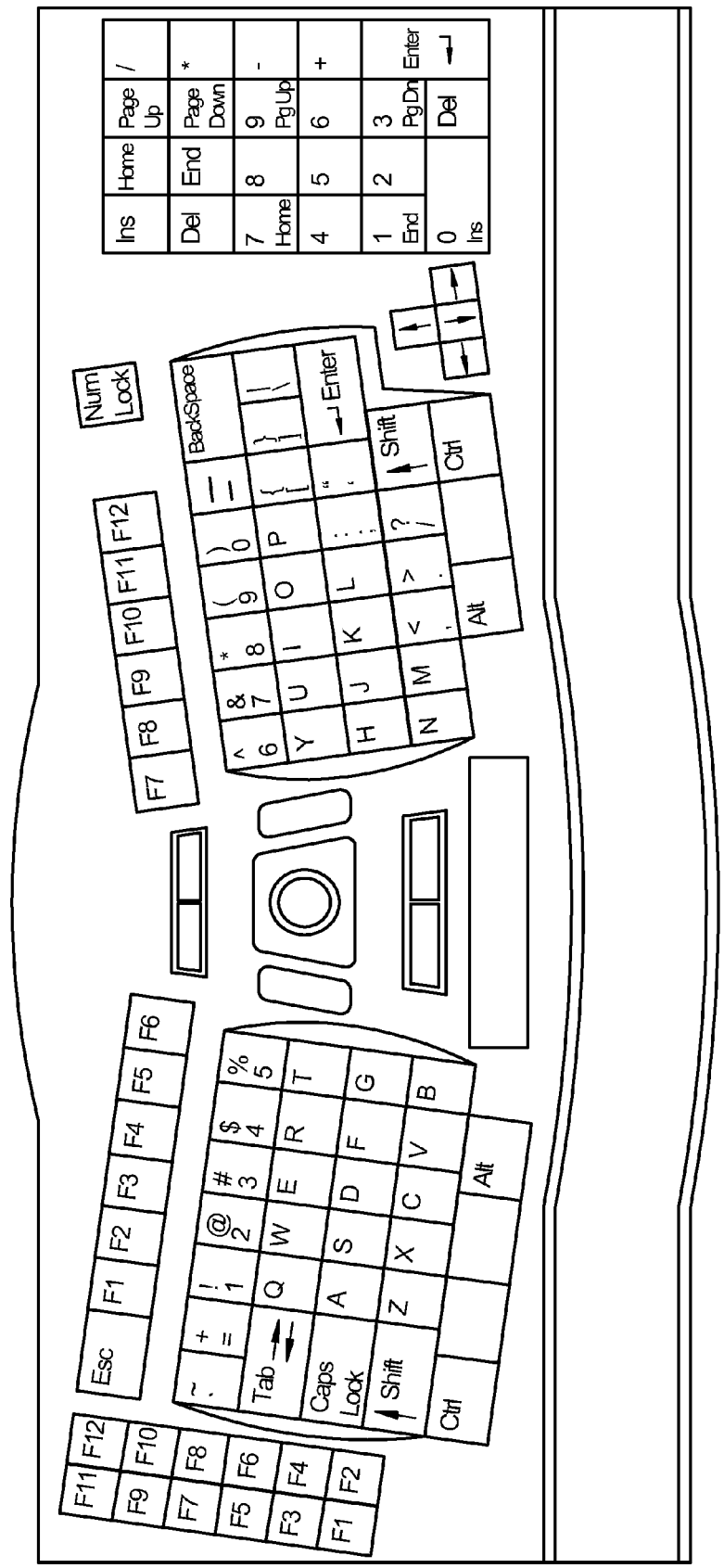
FIG. 6 illustrates another example of an ultimate keyboard in accordance with one or more embodiments.
Figure 7:
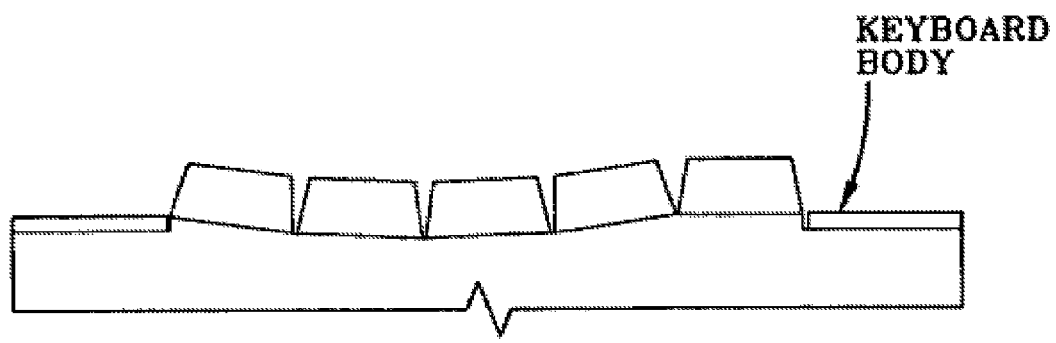
FIG. 7 illustrates one example of a well section of the keyboard in accordance with one or more embodiments.

Use of a keyboard-embedded microchip or keyboard microcontroller with the capability of recording time events with the resolution, preferably, better than 30 milliseconds for static and dynamic password and user authentication according to the proposed algorithm is described below. A computer keyboard having built-in user authentication is described in U.S. Pat. No. 6,442,692 incorporated herein by reference.

A customer's unique password hardened by keystroke-scan dynamics could be used as a single sign-on for various applications and does not require changing the password at certain time intervals. It allows the inclusion of "water marks" (hidden numbers or symbols) into the password.

Watermarks consist of keystrokes hidden in the passwords, which are not displayed in the password text window, but the computer remembers and waits for them. Since there is never a record of the extra keystrokes, a password thief would not be able to identify them. For example, clicking on any key—such as Home, Insert or Shift—will create a Digital Watermark. When entering your password, the watermark symbols or keystrokes should be typed in exactly the same manner and position to allow authentication of the password. At the end of the password (js57gww14), press the backspace key twice and delete the symbols 14. The final password is: js57gww. The last two digits (14) plus two backspaces constitute the Digital Watermarks. Digital Watermarks can be added to the password at any time and can appear at the beginning, the middle, or at the end.

Password created according to ePassguard algorithm allows dynamic real-time user verification without keeping track of the input text. It is attained using statistical processing of one and two-key combinations even in systems that typically do not have real time capabilities. The Integral Typeprint created irrespective of input text and transparent to the user can be used for dynamic unobtrusive verification of users and for file tagging or prioritized management of folders.

The digital signature created during login protects the customer's identity not by what they know (password) or by what they have (smart card) but by who they are: the keystroke-scan characteristics unique to each individual.

In an embodiment, the keyboard-embedded microchip or keyboard microcontroller measures the dwell time on any key and flight time between two consecutive keys with a time resolution from 30 milliseconds down to 30 microseconds. A protocol is used for transferring the measured data to a CPU for further statistical processing, using the latter as a multi-channel analyzer (MCA). The MCA records the typing information received from the microchip or microcontroller into the Integral Typing Matrix (ITM) that consists of approximately 2500 cells. The number of cells may be decreased or increased to incorporate additional symbols or languages.

The Individual Typeprint Digital Signature (ITDS) is created irrespective of input text in a transparent-to-user fashion while the user performs his/her usual typing work.

When used for dynamic unobtrusive verification of who is typing on the computer, the algorithm has a self-learning feature and becomes independent of deviation from normal typing behavior since only inputs with the smallest deviation from the average values are recorded in the Integral Typing matrix and they are permanently updated during the user typing or working at the keyboard. When the user creates a document or email it could automatically save the unique ITDS that could be attached to the document as a digital signature thus making the document legally binding for business or personal applications.

The email that incorporates the ITDS could be used as a safeguard against spam or phishing. The email server could be set up in such a way that only emails with attached or incorporated ITDS that matches ITDS in a database on the given computer or device would pass the filtering process. Another example incorporates matching the ITDS during an email filtering process to the ITDS kept on a third party secure server with encrypted communication.

In one embodiment, ITDS could be used to ensure ownership of digital media and authentication in specially designed systems, for example data witness systems, as a tool to collaborate, execute, and archive legally binding contracts and agreements on-line.

The ITDS is preferably stored both at the microchip embedded in the keyboard and/or in the CPU of the workstation or terminal for validation reference purposes. Thus, in the preferred embodiment, validation of the ITDS is performed at both ends: the user's end and at the processing system, e.g., network server.

Each cell in the ITM acts as a channel of the multichannel analyzer. Each channel incorporates two registers with five cells for storing typing information in a predetermined fashion. For example, if a user types the letter "s"—the dwell time $t_s$ in reversed time units 1/t (RTU) is measured and stored in cell/channel 920 of the ITM of FIG. 11. FIGS. 11A-11C illustrate an example integral typing matrix of the present invention. The flight time between s and h is designated as $f_{sh}$ and is stored in cell/channel 909.

The cell's number is calculated according to the formula: $F_{ik}=50\cdot(i-1)+k$, where i is the number of the first key for which the dwell time was measured and k is the number of the second key the flight time to which was measured.

The i number is selected from the first vertical column of FIG. 11, and the k number is selected from the second horizontal row of the table. For the sake of an example, the cell numbers for dwell $t_i$ and flight $f_{ik}$ times for password shendli are shown in the Table 1.

The cell numbers in Typing Matrix for dwell times $t_i$ and flight times $f_{ik}$ for password shendli is shown below.

| s | | h | | e | | n | | d | | l | | i |
|---|---|---|---|---|---|---|---|---|---|---|---|---|
| 920 | 909 | 359 | 356 | 206 | 215 | 665 | 655 | 155 | 163 | 563 | 560 | 410 |
| $t_s$ | $f_{sh}$ | $t_h$ | $f_{he}$ | $t_e$ | $f_{en}$ | $t_n$ | $f_{nd}$ | $t_d$ | $f_{dl}$ | $t_l$ | $f_{li}$ | $t_i$ |

Summation of dwell and flight times shown in the above table will give the total time $T_p$ needed to type the password $T_p=\Sigma(t_i+f_{ik})$.

Microchip/microcontroller clock could be used to determine independently $T_p$ by measuring the start time for the letter s and the finish time for the letter i. The difference $\Delta T'_p$ between $T_p$ and $T'_p$ is due to the existence of debounce time (dbT), which is a characteristic of keyboard design. dbT depends also on the force and velocity applied during typing. dbT for a given individual and his/her password is a pretty constant value that could be used as an additional attribute for password authentication.

More specifically, when a user types the first letter s the dwell time t is stored in the first cell of Register-1 of channel 920. When a user types the letter "s" for the second time, the $t_s$ is measured and stored in the second cell of Register-1 of channel 920 (third time—stored in the third cell, etc.). Once the first four cells of Register-1 are filled, the algorithm calculates the average RTU of the first four inputs t of the letter "s" and stores the value in the last cell of Register-1 (e.g., the fifth cell in this example). This last cell is labeled "average".

In addition to calculating the average, the microcontroller preferably calculates the deviation from the average for each of the four previous RTU inputs and stores the results of the calculations in the respective cells of Register-2.

The average of the two stored values of Register-1 with the smallest deviations from average is stored in the last cell of Register-2. This average value is then added to the average value of the fifth cell in Register-1, and its median replaces the $t_s$ of the fifth cell of Register-1. This value is used as the reference value in the established ITDS.

With the fifth input of the letter "s" in the above described loop of measuring, storing and processing is repeated in a similar fashion. Thus, for the example above, with each entry of dwell time $t_s$ and flight time $f_{ik}$, shown in the matrix, the processing loop is repeated and the average $t_s$ and $f_{ik}$, obtained in the course of processing the last batch of four inputs, is used for upgrading the average $t_s$ and $f_{ik}$ in the corresponding channel of the ITM.

The above described processing algorithm is equally applicable for obtaining the individual's Typeprint based on password input (e.g., the Password Typeprint) or for obtaining the ITDS based on input of any text, i.e. in the case of "transparent overseeing" or dynamical verification of user's activity in a security critical environment.

In the course of keystroke-scan measuring and processing $t_s$ and $f_{ik}$, as described in the above example, the values of two cells with highest deviation from an average are preferably ignored and have no effect on average value of the considered channel. The number of fields in a Password Typeprint is determined by the formula: 2n−1, where n is the number of symbols in a password (for password shendli n=7 and the number of fields is 13). However, the number of fields in the password Typeprint could be arbitrarily increased by inserting and then deleting the symbols into the password. Inserted and then deleted symbols act as hidden watermark symbols: they are not included in a transmitted password, but they are included in the Password Typeprint—the digital signature attached to the password for authentication purpose.

During the first login procedure or primary authentication (e.g., to establish the Password Typeprint) the user is asked to input his or her password a few times (for example five times). The measured $t_s$ and $f_{ik}$ values are then used to determine the reproducibility of the Password Typeprint of the current user. The algorithm incorporates a control filter that cuts-off keystroke dynamics with the $t_s$ and $f_{ik}$ values less than 500 and data with the deviation values more than a preset value (default value—30%).

In cases when the ITM is used for "transparent overseeing", the reference or established ITDS, measured and stored in the database at the CPU, may contain some units or channels which were not produced during the current "transparent overseeing". In such a case, the verification is conducted based on a comparison of those channel values which are present both in the established (reference) ITDS and the currently generated ITDS.

In an embodiment, the algorithm supports the most common standard communication protocols for client—server connection, and provides solutions for alternative protocols.

The first login procedure preferably includes three screens.
Screen One: Creating ePassguard password
Enter your first and last name.
Type your pin number.
Type your favorite phrase.
(Pressing the submenu button in this window opens a list of randomly generated short citations or favorite phrases. For example: never go the supermarket when you are hungry.)

Next window: recommended password.

The program creates a password according to recommendations by selecting symbols from the above four windows and then dispersing the selected symbols with the pin numbers. The suggested password contains not less than 6 characters and symbols and is not found in a dictionary. For example: for Arkady Zilberman (PIN number 5714) and above given favorite phrase, the suggested password is: az57ngs14. The window with a suggested password has next to it two buttons: accept and edit.

Next window:

The window asks the user to type the new password at least ten times before using it. The window instructs the user to pay special attention to typing consistency when using the password. The user should not change fingers or typing style since passwords contain only about ten keys to determine uniqueness of the password. This preferably becomes a permanent password: the user does not need to change it. The user's identity and sensitive data are strongly protected.

The program measures the scatter of Typeprint characteristics and shows a green light (if the scatter is less than 30%) with the caption: you may start using your new ePassguard password now. If the scatter is more than 30%, the yellow light appears on the screen with the caption: Please, type your new ePassguard password with the same speed five more times.

Screen Two:

The next screen preferably has a window for a password and a caption: ePassguard password. The next caption: type the password once more.

Repeat it four times. The algorithm uses five inputs for calculation of the Typeprint that is shown to the right.

Figure 12:
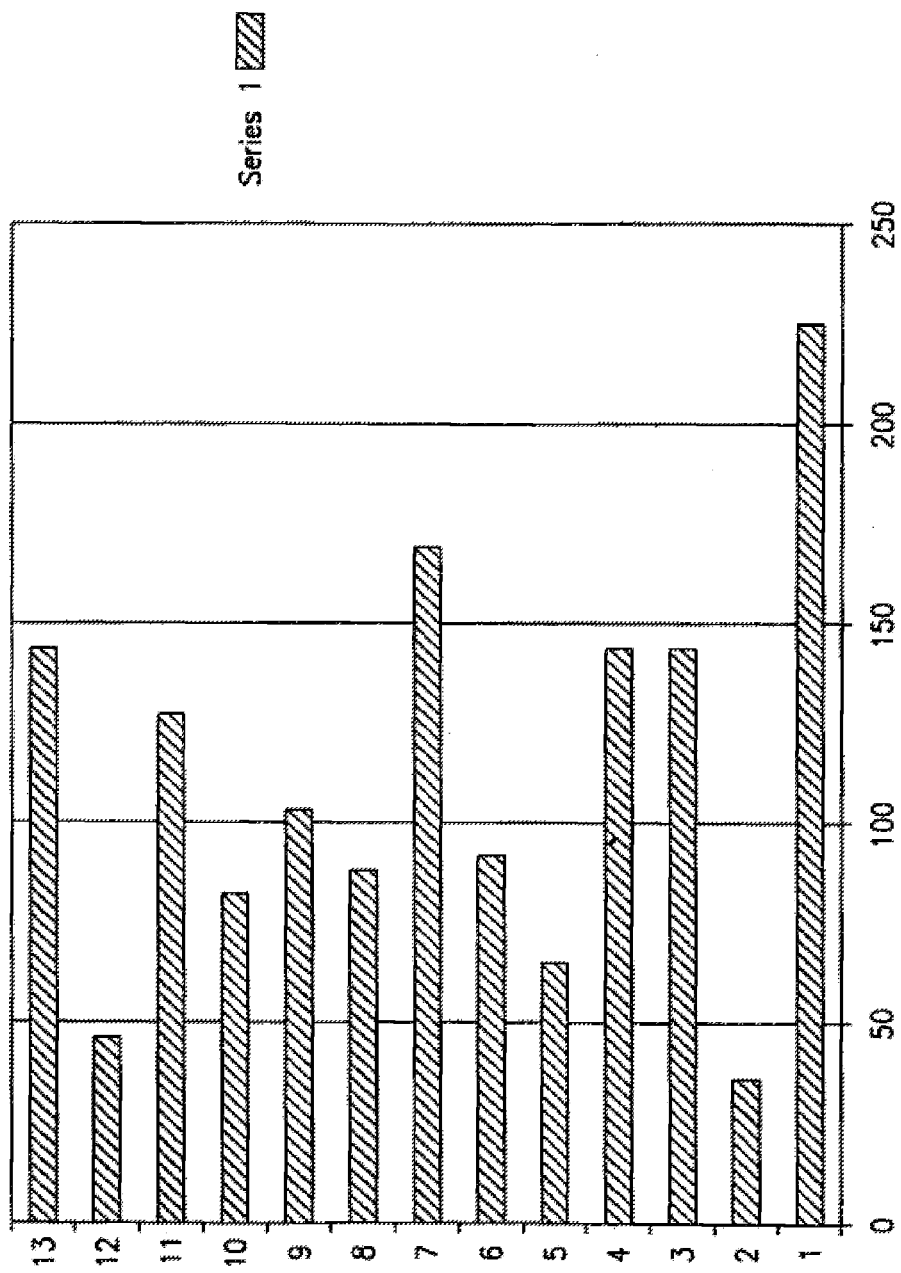
FIG. 12 illustrates one example of a typeprint.

Screen Three:

The next window preferably asks the user to type the ePassguard password—Typeprint preferably appears next to it. See FIG. 12 for an example of a Typeprint displayed in accordance with one or more embodiments.

The Typeprint is preferably constructed immediately using $t_s$ and $f_{ik}$ values of the password to be authenticated. The Typeprint determined only on this one entry is shown right to this window. The bottom of the window is filled with a green light if password Typeprint is similar and with a red light if it is dissimilar.

In one embodiment, a time stamp or delay period may be inserted into the password. In other words, the user may pause before inputting the next symbol of the password. For example, before hitting the next symbol the user may pronounce a phrase (preferably not aloud): "change your thoughts and you will change your destiny"—it becomes the time mark of the typeprint for the given password. To login with this password the user should remember to say the same phrase after the same typed symbol each time on login. Accordingly, the user can insert anywhere in a password a time stamp, for example, 37 seconds and 20 milliseconds, and it will become the part of the user Typeprint.

Accordingly, the user can insert anywhere in a password the voice stamp, which is recorded by a microphone and is turned into the time stamp and the data pattern. Accordingly, the user can insert anywhere in a password the graphic stamp, which is prerecorded and turned into the data pattern by using a data extraction algorithm.

In one embodiment, the password Typeprint includes watermarks and inserted time stamp but does not compare the typing characteristics. This type of application is needed, for example, if the user is ill and can't type himself but his secretary or associate or confidant may still login on his behalf and have access to the data.

In another embodiment, the password Typeprint includes watermarks and an inserted voice stamp which is recorded by microphone and turned into the data pattern by using the data extraction algorithm, but does not compare the typing characteristics.

In another embodiment, the password Typeprint includes watermarks and an inserted graphic stamp which is prerecorded or recorded by a built-in camera and turned into the data pattern by using the data extraction algorithm, but does not compare the typing characteristics.

In one embodiment, the ratio or pattern between dwell and flight times within the password is used as a typing characteristic or used to generate a user Typeprint. For example, the ratio between dwell times for password "s h e n d l i" for one user might be 0.9:1.01:0.87:1.0:0.9:0.95:0.88—which would be different from that of another user. In another example, the ratio between flight times for the user is also a stable and unique characteristic and could be used for user authentication along with the password Typeprint.

Figure 9A:
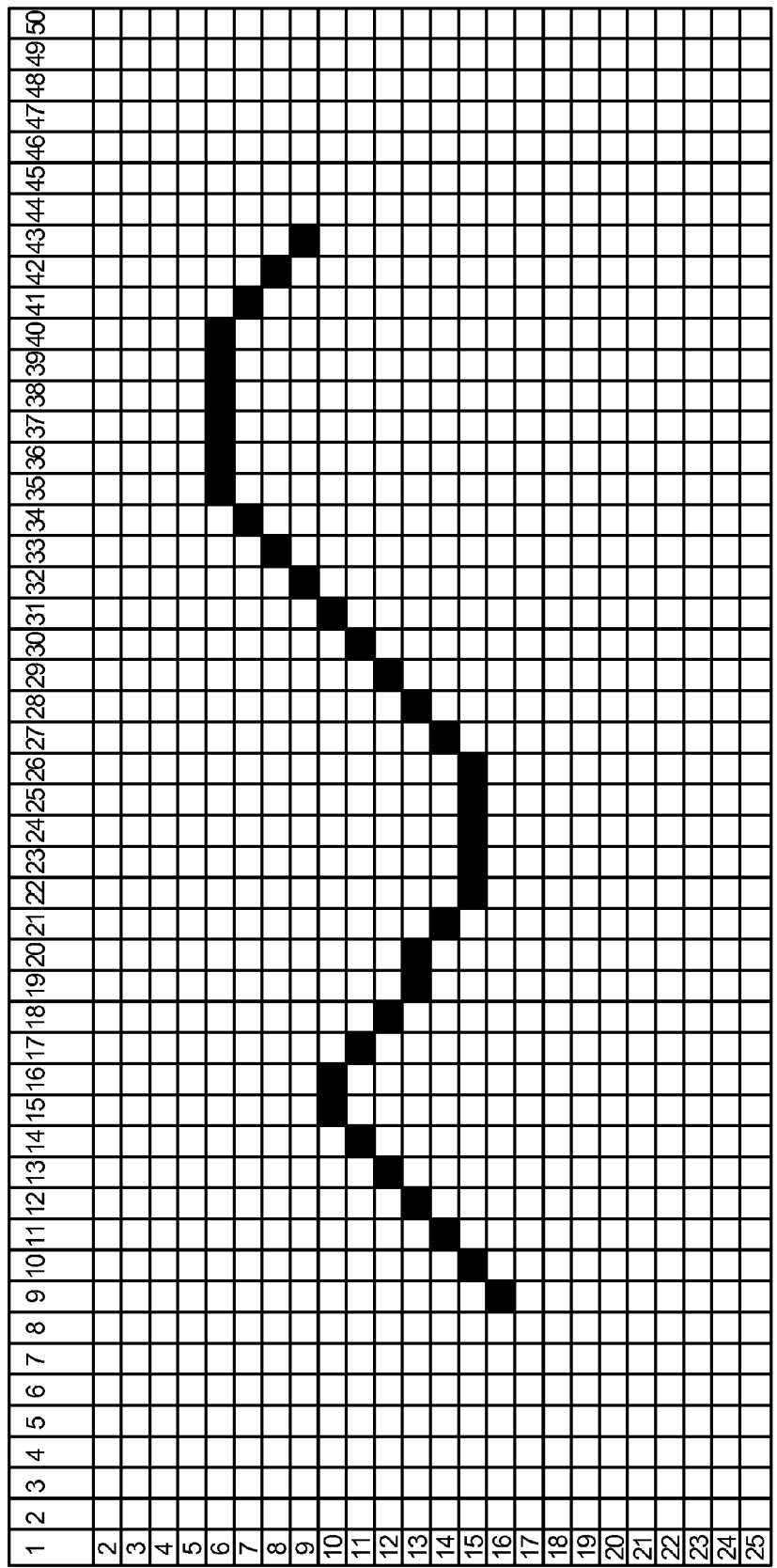
FIGS. 9A-9B illustrate one example of an integral mouse grid for recording cursor movements.
Figure 9B:
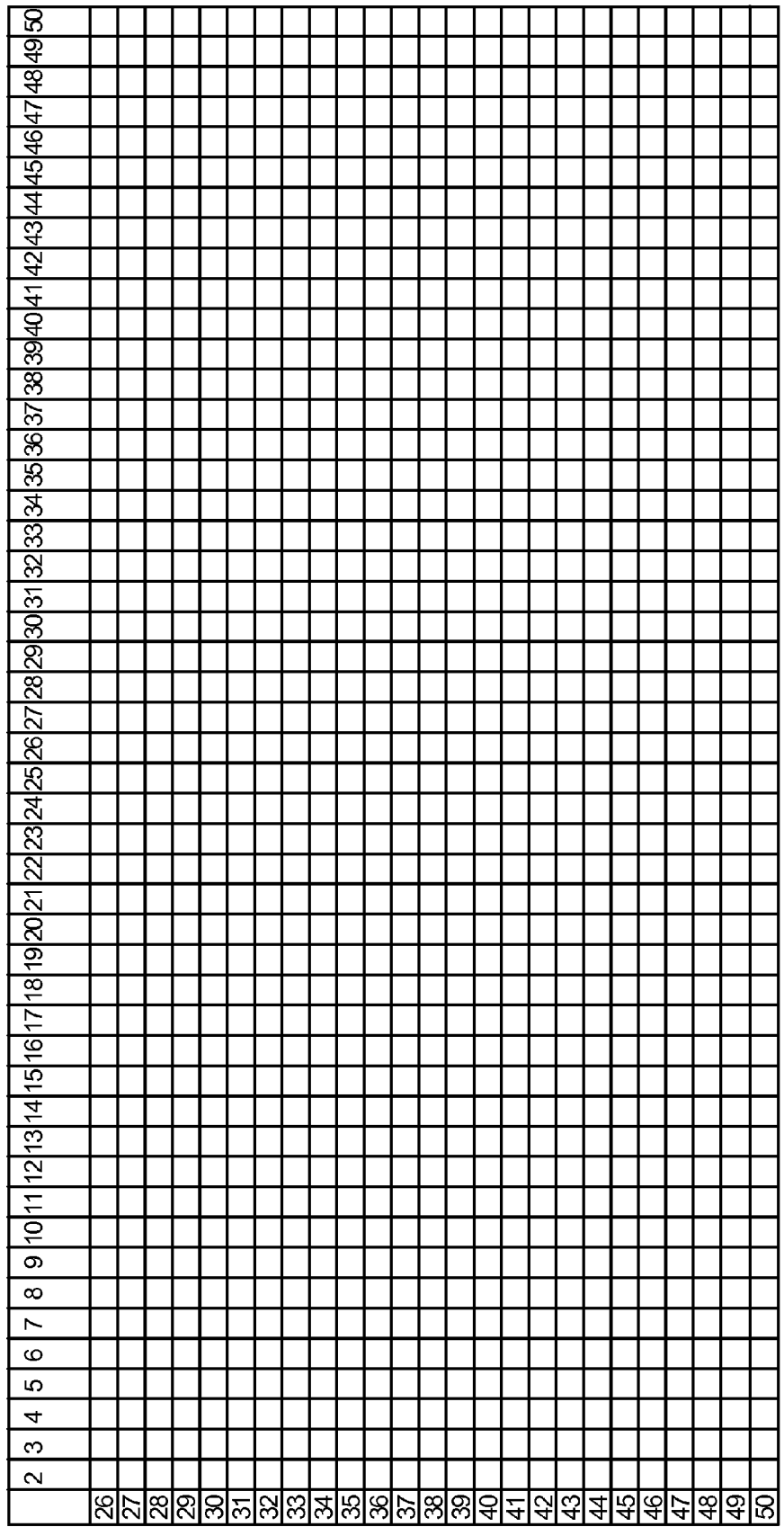
Figure 10:
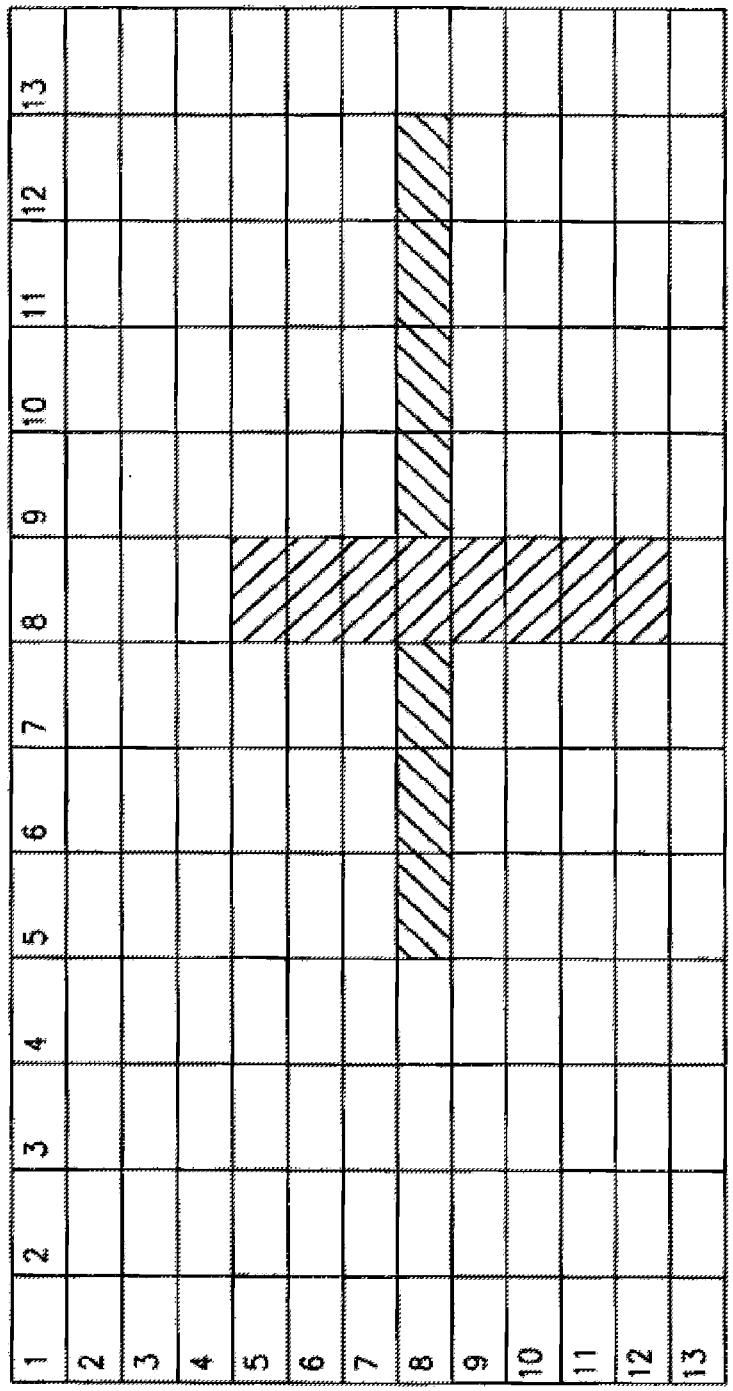
FIG. 10 illustrates one example of a mouse grid section showing straight cursor movement.

When working with a mouse a user reveals certain characteristics that are as unique as his/her Typeprint produced by keystroke-scan method described above. To enhance statistical processing and retrieval of unique information exhibited by each user using a mouse device, we convert the screen into a grid that contains a certain number of cells. In our example, we consider a grid containing 2500 cells (table illustrated in FIG. 9). The number of cells in the grid could be decreased or increased depending on the used device or screen size.

The mouse movement is described by two coordinates: i and k, where i is the cell number in the grid in reference to the vertical axis and k is the cell number of the cell in the grid in reference to the horizontal axis. The black line in the table describes the cursor movement in the opposite direction from cell $T_{12\text{-}8}$ to $T_{5\text{-}8}$.

In one embodiment, the system can be programmed to generate a reference mouse characteristic for a user based on cursor movement speed. For example, the user may be shown a computer screen with alphanumeric symbols displayed on the computer screen. The user may be asked to input a password by moving the cursor (via mouse) over the screen to click on the symbols in a desired sequence. The system, preferably using the embedded microcontroller, monitors the mouse movement speed and inputs, and records the password and generates and stores a reference mouse characteristic for the user. This characteristic includes the numbers of cells in the grid and the movement speed between two consecutive cursor stops. Subsequently on the next login, the user again enters the password via the mouse and a second mouse characteristic is generated. The second mouse characteristic is compared with the reference mouse characteristic and the user is only allowed access if the second mouse characteristic is sufficiently similar to the reference mouse characteristic.

FIGS. 1-6 illustrate various embodiments of the keyboard in accordance with one or more embodiments. As illustrated, the user may configure the keyboard according to personal preferences.

The proposed ultimate keyboard has the following advantages:

1. It consists of a family of keyboards that allows customers to select one of several prefabricated keyboards during order customization. The family of ultimate keyboards is designed taking into account both recommendations of ergonomic experts: left and right parts of the keyboard are rotated and form an angle at the top of 30 degrees or less; left and right parts of the keyboard are shifted apart at the distance of up to four inches.

2. The keyboard meets a multitude of specific requirements of personal computers, industrial and scientific applications (lab equipment, Sun Microsystems computers, UNIX etc.).

3. Parallel key-columns offer an important biomechanical advantage since they require mainly one-coordinate outreaching to the keys in comparison to two-coordinate outreaching in conventional keyboards. This substantially mitigates the stress in finger muscles by simplifying the finger targeting to the next key during typing.

Figure 8:
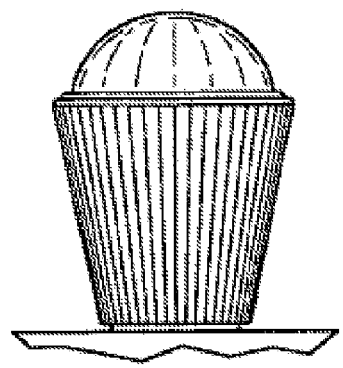
FIG. 8 illustrates one example of a rollerball section.

4. The trapezoid space that is formed in the middle as a result of rotating and shifting apart the left and right parts of the keyboard is delegated to the most important and/or frequently used functions, which are the Enter and Space keys and the devices for cursor movement, such as Touchpad or RollerBall. See FIG. 8. The option of having a Touchpad and/or RollerBall devices in the middle of the keyboard ensures a more neutral forearm and shoulder position, compared to a traditional mouse design.

5. The advanced users have a choice of both mouse modules on one keyboard. Switching between the two modules mitigates mouse syndrome by breaking the cycle of repetitive motions.

6. The option of having additional 12 function keys expands keyboard functionality and provides new features: it can be used for creating macros, adapting keyboard to business and scientific applications, and using it for Favorites and more efficient Internet browsing.

The invention claimed is:

1. A keyboard, comprising:
a memory configured to store time durations that correspond to key inputs, wherein the time durations include:
a first set of time durations corresponding to a key input duration that a key input is depressed, and
a second set of time durations corresponding to a key transition duration between releasing one key input to initiating a next key input; and
a microcontroller configured to:
register key inputs,
register additional key inputs that are different than the key inputs,
store additional time durations that correspond to the additional key inputs, and
execute an algorithm to generate:
an input signature based on at least one of:
a first ratio of time durations of the first set of time durations, and
a second ratio of time durations of the second set of time durations, and
a subsequent input signature based on the additional time durations that correspond to the additional key inputs.

2. The keyboard of claim 1, further comprising:
a left portion comprising a first set of keys positioned in rows and orientated in left parallel columns; and
a right portion split apart from the left portion and comprising a second set of keys positioned in the rows and orientated in right parallel columns, the left portion and the right portion each rotated to position the rows of the first set of keys at an angle with respect to the rows of the second set of keys;
wherein the keyboard is customizable to several configurations according to user preferences.

3. The keyboard of claim 2, further comprising a space between the left portion that is split apart from the right portion, and wherein the space includes at least one of key or input device.

4. The keyboard of claim 3, wherein the at least one key includes an Enter key or a Space key positioned in the space between the left portion and the right portion.

5. The keyboard of claim 3, wherein the input device is a Touchpad or a RollerBall positioned in the space between the left portion and the right portion.

6. The keyboard of claim 2, wherein the left parallel columns of the first set of keys and the right parallel columns of the second set of keys allows one-coordinate outreaching to an adjacent key and simplifies finger targeting to a next key when a user is typing.

7. The keyboard of claim 2, wherein the rows of the first set of keys are positioned at a 30 degree angle or less with respect to the rows of the second set of keys.

8. A method, comprising:
receiving key inputs at a keyboard that are registered by a microcontroller;
storing time durations that correspond to the key inputs, the time durations being stored in memory at the keyboard, wherein the time durations include:
a first set of time durations corresponding to a key input duration that a key input is depressed, and
a second set of time durations corresponding to a key transition duration between releasing one key input to initiating a next key input;
generating an input signature based on at least one of:
a first ratio of time durations of the first set of time durations, and
a second ratio of time durations of the second set of time durations;
receiving additional key inputs at the keyboard that are registered by the microcontroller, the additional key inputs being different than the key inputs;
storing additional time durations that correspond to the additional key inputs, the additional time durations being stored in the memory at the keyboard; and
generating a subsequent input signature based on the additional time durations that correspond to the additional key inputs, the input signature matching the subsequent input signature in response to the time durations corresponding to the additional time durations.

9. A non-transitory computer-readable medium storing executable instructions that, when executed, cause a computing device to perform operations comprising:
receiving key inputs, at a computing device, that are registered by a microcontroller;
storing time durations that correspond to the key inputs, the time durations being stored in memory at the computing device, wherein the time durations include:
a first set of time durations corresponding to a key input duration that a key input is depressed, and
a second set of time durations corresponding to a key transition duration between releasing one key input to initiating a next key input; and
generating an input signature based on at least one of:
a first ratio of time durations of the first set of time durations, and
a second ratio of time durations of the second set of time durations,
wherein the input signature matches a subsequent input signature that is based on additional time durations that correspond to additional key inputs, the additional key inputs being different than the key inputs.

* * * * *